US011843600B2

(12) United States Patent
Berdy et al.

(10) Patent No.: US 11,843,600 B2
(45) Date of Patent: Dec. 12, 2023

(54) SUBNET-BASED DEVICE ALLOCATION WITH GEOFENCED ATTESTATION

(71) Applicant: Microsoft Technology Licensing, LLC, Redmond, WA (US)

(72) Inventors: Nicole Elaine Berdy, Kirkland, WA (US); Jelani Zukar Brandon, Woodinville, WA (US); Timothy James Larden, Bellevue, WA (US); Alexander I. Tolpin, Redmond, WA (US); SachinKumar Chandramohan, Irvine, CA (US); Tamer Awad, Redmond, WA (US); Mounica Arroju, Redmond, WA (US); Rajeev Mandayam Vokkarne, Sammamish, WA (US); Puneet Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/180,742

(22) Filed: Nov. 5, 2018

(65) Prior Publication Data

US 2020/0145415 A1    May 7, 2020

(51) Int. Cl.
*H04L 12/46*    (2006.01)
*H04L 9/40*     (2022.01)
(Continued)

(52) U.S. Cl.
CPC ...... *H04L 63/0876* (2013.01); *H04L 63/0807* (2013.01); *H04L 63/0884* (2013.01); *H04L 67/12* (2013.01); *H04W 4/021* (2013.01)

(58) Field of Classification Search
USPC .................................................. 709/220–228
See application file for complete search history.

(56) References Cited

U.S. PATENT DOCUMENTS 9,781,602 B1    10/2017  Girdhar et al.
9,853,826 B2    12/2017  Shuman et al.
(Continued)

FOREIGN PATENT DOCUMENTS

WO    2017189523 A1    11/2017
WO    2018194971 A1    10/2018

OTHER PUBLICATIONS

Desai, Nisarg, "Identifying the Internet of Things—one device at a time", Retrieved from: https://www.networkworld.com/article/3287927/internet-of-things/identifying-the-internet-of-things-one-device-at-a-time.html, Jul. 6, 2018, 8 Pages.
(Continued)

*Primary Examiner* — Younes Naji
*Assistant Examiner* — Da T Ton
(74) *Attorney, Agent, or Firm* — Mark K. Young; Mark Young PC

(57) ABSTRACT

An IoT hub comprising one or more servers and databases is configured to automatically assign Internet of Things (IoT) enabled devices to IoT solutions based on a subnet to which the IoT devices are connected. A user interface is configured to enable a user to define subnets within the customer's network environment and assign each subnet to an IoT solution. Upon the user setting up an IoT device's network connection to a network device, such as a router, the IoT device transmits its network information to the IoT hub. The IoT hub can then automatically assign the IoT device to a specific IoT solution without further user input or predict which IoT solution to utilize for that IoT device based on known parameters.

18 Claims, 16 Drawing Sheets

(51) Int. Cl.
*H04L 67/12* (2022.01)
*H04W 4/021* (2018.01)

(56) References Cited

U.S. PATENT DOCUMENTS

| | | | | |
|---|---|---|---|---|
| 10,291,477 | B1* | 5/2019 | Askar | H04W 4/50 |
| 10,440,579 | B1* | 10/2019 | Korrapati | H04W 4/50 |
| 2014/0241354 | A1* | 8/2014 | Shuman | H04W 4/08 370/390 |
| 2014/0337530 | A1* | 11/2014 | Amishav | H04L 67/51 709/226 |
| 2015/0244613 | A1* | 8/2015 | Sullenberger | H04L 45/74 370/400 |
| 2016/0128043 | A1 | 5/2016 | Shuman et al. | |
| 2017/0099352 | A1 | 4/2017 | Baughman et al. | |
| 2017/0149775 | A1* | 5/2017 | Bachar | H04L 67/10 |
| 2017/0155703 | A1* | 6/2017 | Hao | H04L 67/12 |
| 2017/0230832 | A1 | 8/2017 | Ophir et al. | |
| 2019/0007899 | A1* | 1/2019 | Vrzic | H04W 8/02 |
| 2019/0132205 | A1* | 5/2019 | Du | H04L 41/069 |
| 2019/0132236 | A1* | 5/2019 | Rahman | H04W 52/28 |
| 2019/0174449 | A1* | 6/2019 | Shan | H04W 60/00 |
| 2019/0387401 | A1* | 12/2019 | Liao | H04W 36/08 |
| 2020/0244297 | A1* | 7/2020 | Zalewski | H04W 76/10 |
| 2021/0058300 | A1* | 2/2021 | Karkkainen | H04L 41/0893 |

OTHER PUBLICATIONS

Pickering, Rob, "Ubiquiti—Configure micro-segmentation for IoT devices", Retrieved from: https://robpickering.com/ubiquiti-configure-micro-segmentation-for-iot-devices/, Dec. 3, 2016, 22 Pages.

Qu, et al., "Blockchain Based Credibility Verification Method for IoT Entities", In Journal of Security and Communication Networks, vol. 2018, Jun. 27, 2018, 12 Pages.

"International Search Report and Written Opinion issued in PCT Application No. PCT/US2019/058419", dated Feb. 7, 2020, 11 Pages.

"Office Action Issued in European Patent Application No. 19805471.0", dated Sep. 13, 2022, 8 Pages.

"Office Action Issued in India Patent Application No. 202147019571", dated Dec. 15, 2022, 7 Pages.

"Notice of Allowance Issued in European Patent Application No. 19805471.0", dated Jun. 28, 2023, 8 Pages.

* cited by examiner

100

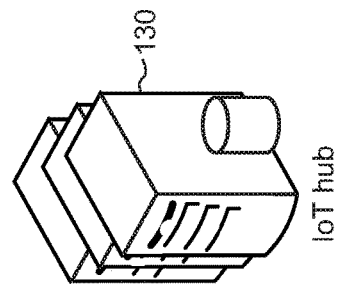

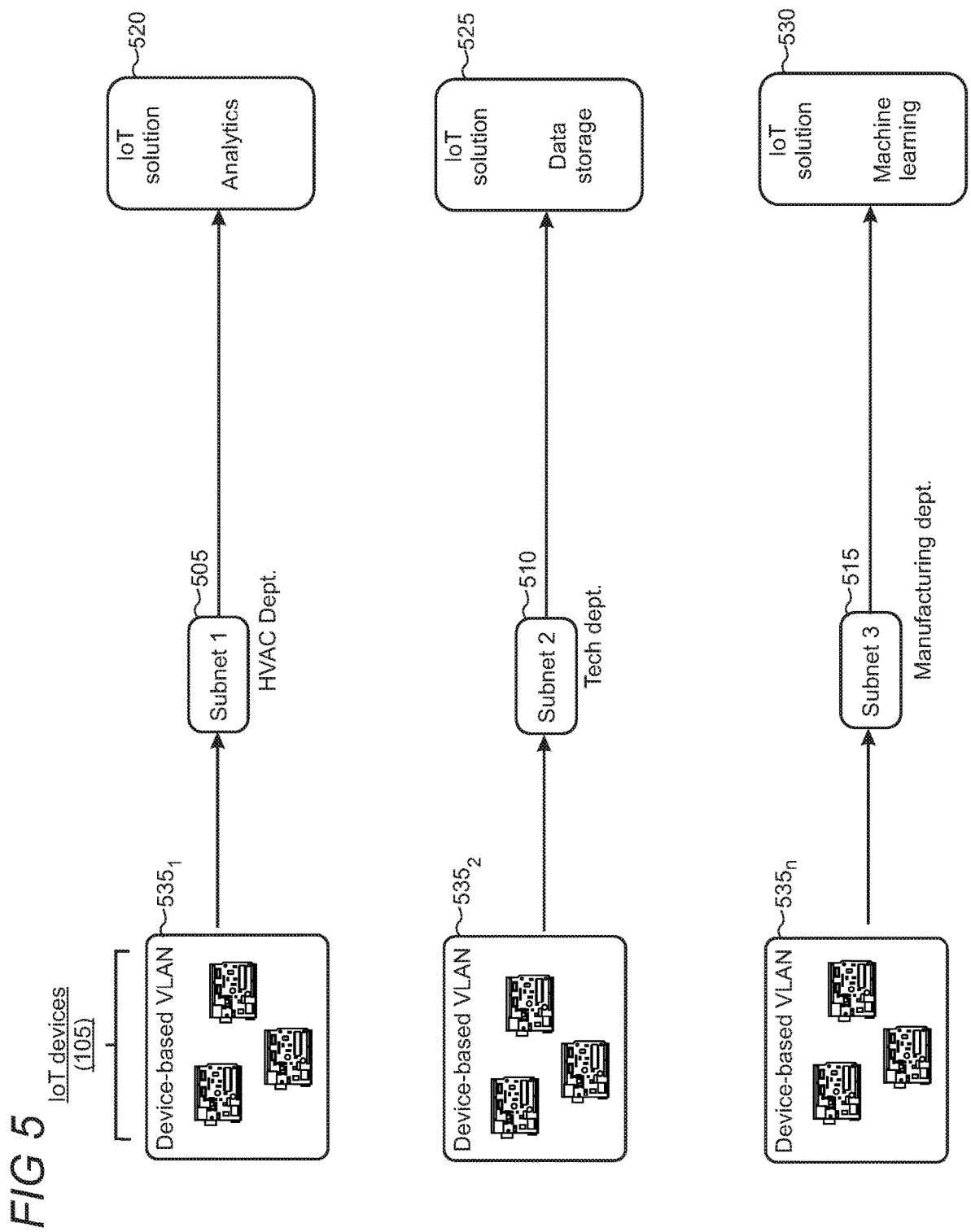

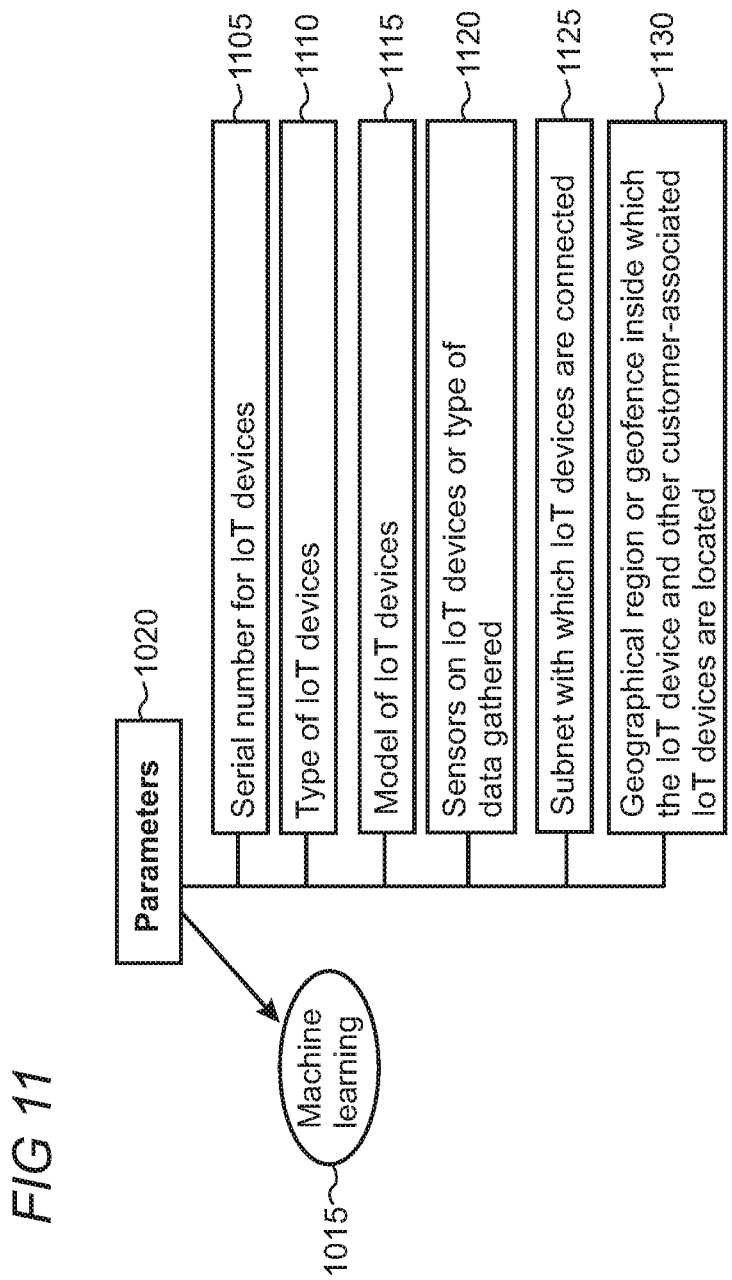

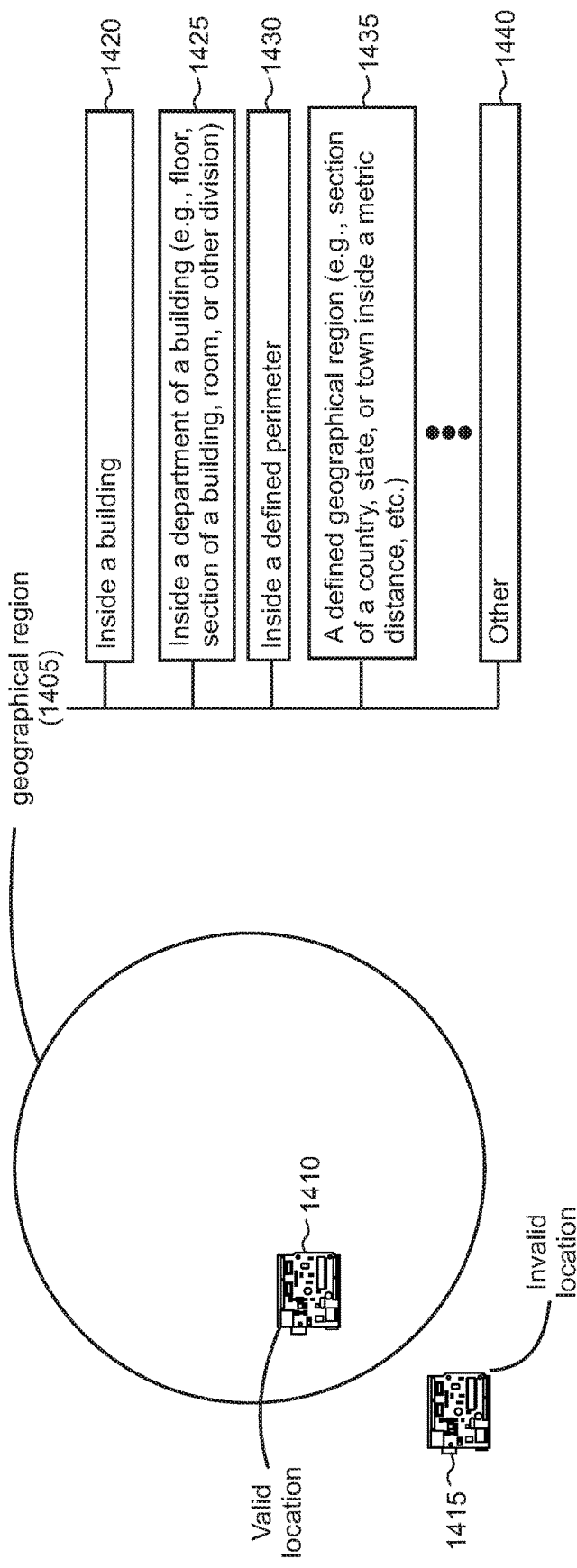
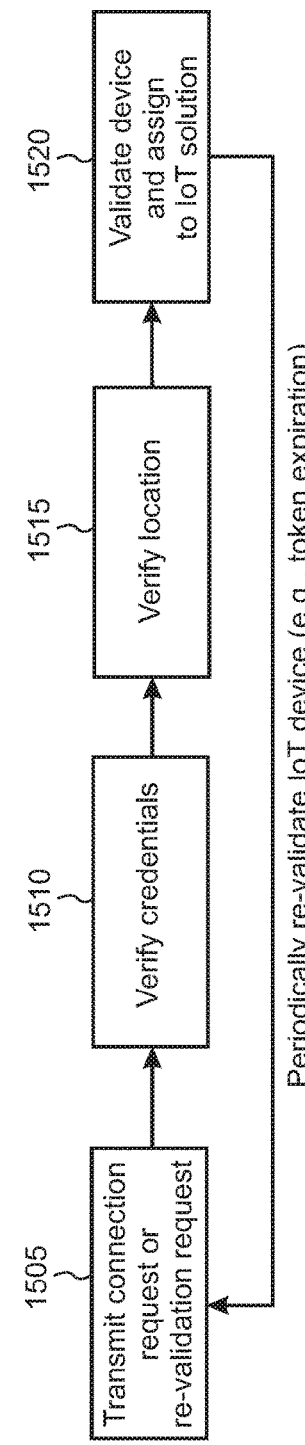
FIG 14
FIG 15

1600

1800

SUBNET-BASED DEVICE ALLOCATION WITH GEOFENCED ATTESTATION

BACKGROUND

The Internet of Things (IoT) connects devices having various types, sizes, and functions over a network. For example, the devices (or "things") in the IoT can be a location tag, a connected thermostat, a monitoring camera, a sensor device, industrial machine, or anything that can communicate data over a network connection. IoT devices typically have a way to connect to the Internet to report telemetry data to other devices and/or services and request/receive information from other devices or services.

IoT devices typically connect to an IoT hub, which can be a collection of servers and databases, operated by a cloud service provider so that an IoT device is associated with a customer account. This enables the customer to exercise control over the IoT device and utilize the IoT solutions provided by the IoT hub.

SUMMARY

An IoT hub is configured to automatically assign IoT devices to specific IoT solutions based on a subnet to which the IoT devices are connected. The IoT devices are configured for connectivity to a networking device, such as a router or gateway, that supports packet forwarding to the IoT hub. The IoT device sends network information to the IoT hub at the initiation of a communication session that the IoT hub uses to allocate a specific IoT solution for the IoT device. IoT solutions can include software that is configured to support and interoperate with particular IoT device functionalities. For example, IoT solutions can include artificial intelligence and machine learning algorithms and processes, analytic tools, automated operations, and data storage, among other solutions. Monitoring by the IoT hub helps customers to maintain the health of their solutions by tracking events such as device creation, device failures, and device connections.

Subnets are generally defined by the networking devices that the IoT devices utilize for network connectivity. In some implementations, multiple subnets can be created behind a single networking device by using a subnet mask and reconfiguring the IP (Internet Protocol) addresses for the host IoT devices. IoT device users (e.g., customers for the IoT solutions) may set network configuration, create subnets, and assign the IoT devices subnets to specific IoT solutions using an IoT device management application that enables communication with a service provider.

The network configuration can include grouping code for IoT devices that the IoT hub may utilize to implement various IoT solution connectivity options. For example, an option may include the IoT hub automatically assigning newly connecting IoT devices to an IoT solution to which an existing group of devices is connected from the same subnet. Additional options enabled by the grouping code utilized by the IoT hub can involve the application of prediction algorithms. The IoT hub can apply the algorithms to predict and assign IoT devices to IoT solutions without having to rely on user input. The predictions may be performed using hard-coded rules or machine learning techniques that use various parameters that are available at the IoT hub. Illustrative machine learning parameters can include IoT device serial number, type, model, types of sensors utilized, types of data gathered, subnet to which the IoT devices are connected, and geofence inside which IoT devices are located. The IoT hub may use the predicted device groupings to shorten IoT device setup and deployment times and reduce management overhead for customers.

Geofenced attestation can also be utilized as a tool to streamline validation of IoT devices while increasing device and network security for the users by associating IoT devices with a geofence (i.e., a defined geographical region). When the IoT device is inside the geofence, the IoT hub enables connection with an appropriate IoT solution. Otherwise, the IoT hub rejects the IoT device connection.

Geofenced attestation may occur when the IoT device initiates a connection request with the IoT hub. In this process the IoT device transmits attestation credentials, network information (e.g., for the subnet-based assignment feature discussed above), and a current location that the IoT hub uses to verify the IoT device's location. The IoT device may periodically transmit the current location to enhance its security to thereby verify that it is not stolen, misplaced, or compromised, for example by malicious software.

Alternatively, the entire connection request procedure may be periodically performed. For example, the IoT hub may assign a unique token to the IoT device upon validation where the token is assigned a time duration after which the token expires. For the IoT device to continue using the IoT solution, it re-validates at least it's location with the IoT hub to receive another time-sensitive token.

The assignment of IoT devices based on subnet connectivity and geofenced attestation features provides a streamlined process for connecting, managing, and enhancing security of IoT devices. Using the subnet-based connectivity to IoT solutions enables fine-tuned control over IoT devices using a mix of manual and automated methods that may be facilitated with the IoT management application. The application can support a user interface (UI) that enables users to manage their subnet-based IoT infrastructure. The IoT management application provides a number of technical benefits by decreasing set-up time for IoT networks, expediting IoT device implementation, and reducing errors when mapping IoT solutions to IoT devices.

The implementation of geofenced attestation further enhances network and device security by verifying that an IoT device location is inside a defined geofence before permitting a connection to the IoT solution. Periodic geofenced attestation can further improve security by enhancing the detection of lost, stolen, or compromised IoT devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 3 shows illustrative definitions for subnets;

FIG. 4 shows illustrative network devices which may comprise a local area network (LAN);

FIG. 5 shows an illustrative environment in which groups of IoT devices are connected to specific IoT solutions based on the subnet to which they are connected;

FIG. 11 shows a taxonomy of parameters which may be utilized by machine learning algorithms to predict IoT solutions for IoT devices;

FIG. 14 shows an illustrative geofence which is used for validating the IoT device with an IoT solution;

FIG. 15 shows an illustrative flow chart by which the IoT hub validates IoT devices;

Like reference numerals indicate like elements in the drawings. Elements are not drawn to scale unless otherwise indicated.

DETAILED DESCRIPTION

Customers can implement IoT devices to communicate with the IoT hub to manage certain functions and operations for the IoT devices. For example, HVAC (heating, ventilation, and air conditioning) industries can utilize sensors (e.g., thermometers, thermostats, humidity sensors, etc.) to monitor conditions in real time, automate processing, and perform real-time diagnostics as conditions change. The HVAC department may be one department within a university, manufacturing plant, or other departmental or divisional organization that implements IoT devices to manage tasks and operations. Each department within an organization may implement numerous IoT devices to track all facets of their industry, business, or operation. In some implementations, the cloud service provider may assign IoT devices to a geographically-nearest IoT hub and solution.

The IoT hub may include a collection of servers and databases that are used with IoT applications to securely connect, monitor, and manage up to billions of devices. The IoT hub can be implemented as a managed service, hosted in the cloud, that acts as a central message hub for bi-directional communication between an IoT application and the devices it manages. The IoT hub supports communications both from the device to the cloud and from the cloud to the device. The IoT hub can support multiple messaging patterns such as device-to-cloud telemetry, file upload from devices, and request-reply methods to control devices from the cloud.

As discussed in more detail below, in the present subnet-based device allocation with geofenced attestation, an IoT hub assigns the IoT device to an IoT solution and validates the IoT device, but in some implementations a provisioning service operating on distinct servers may perform these operations and operate in tandem with the IoT hub. Therefore, reference to the IoT hub indicates operations by a remote server and may signify operations by the provisioning service, IoT hub, or both the IoT hub and the provisioning service.

Figure 1:
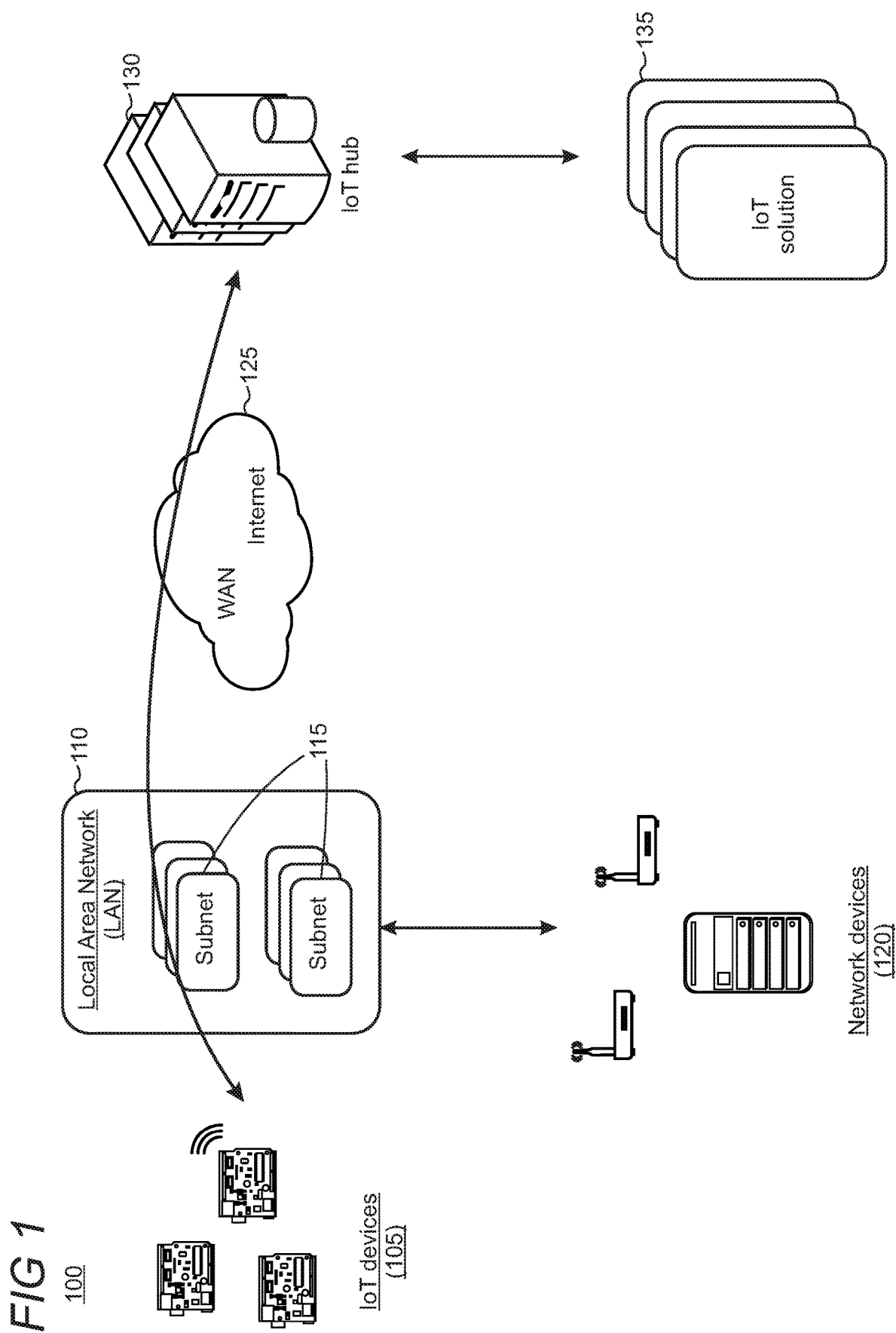
FIG. 1 shows an illustrative environment in which IoT devices connect to a local area network to utilize IoT solutions provided by an IoT hub.

Turning now to the drawings, FIG. 1 shows an illustrative environment 100 in which several Internet of Things (IoT) configured devices 105 are adapted to communicate over a network 125 with an IoT hub 130 provided by a cloud service provider, which can respectively include one or more remote servers and databases. The IoT devices may be utilized on a customer's premises and connect to network devices 120, such as a router, access point, edge gateway device, or other type of network connection, within the customer's local area network (LAN) 110 to utilize the IoT solutions 135 offered by the IoT hub. The network infrastructure of the LAN may include one or more subnets 115 that IoT devices utilize. The subnets may be distinct networks on the LAN which separate groups of IoT devices. The LAN through one or more edge gateway devices may communicate with a core network 125 which routes messages to and from the IoT hub and can include a wide area network (WAN) and the Internet.

Figure 2:
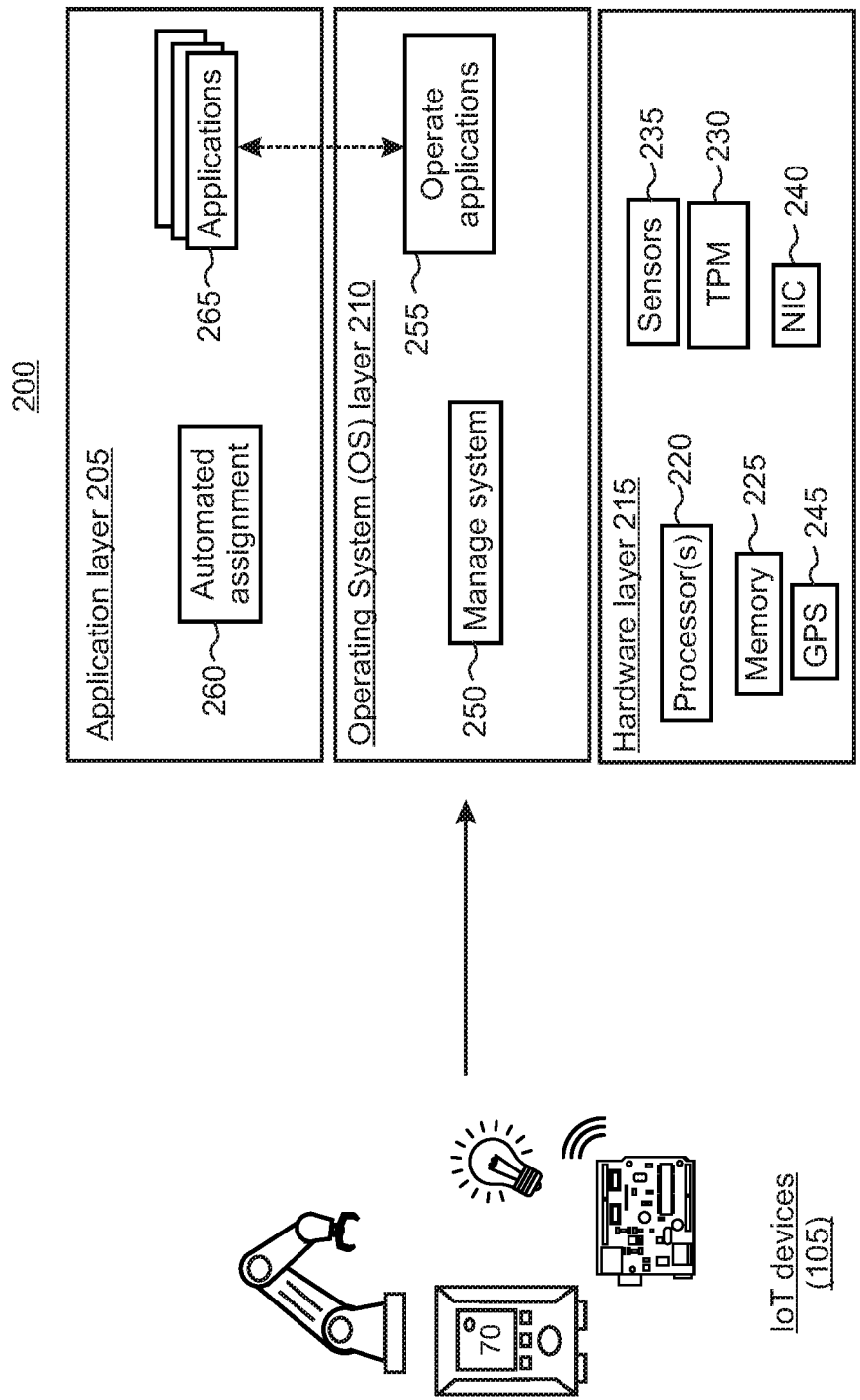
FIG. 2 shows an illustrative architecture of an IoT device.

FIG. 2 shows an illustrative and generic architecture 200 of an IoT device 105. IoT devices may interconnect and/or communicate over various networks, and typically utilize one or more sensors to gather pertinent data useful to particular devices and for a particular reason. IoT devices can utilize various sensors, actuators, software, network connectivity, and connections to remote servers (e.g., the IoT hub) to thereby facilitate and establish comprehensive knowledge, understanding, or insight into a component or its environment. As illustratively shown in FIG. 2, exemplary IoT devices 105 can include commercial machinery like a crane, or household items such as a light bulb, thermostat, and the like. However, these devices are only illustrative, as the number, variety, and/or type of objects or components which can be configured as an IoT device are virtually unlimited. An exemplary motherboard which may include a System on a Chip (SoC) configuration is illustratively shown that can implement an IoT device or enable transition of a device, component, or object into an IoT-configured device.

The architecture is arranged in layers and includes a hardware layer 215, an operating system (OS) layer 210, and an application layer 205. The hardware layer 215 provides an abstraction of the various hardware used by the IoT device 105 to the layers above it. In this illustrative example, the hardware layer supports one or more processors 220, memory 225, NIC (network interface controller) 240, a trusted platform module (TPM) 230, various sensors 235 for gathering data, and a location component like a global positioning system (GPS) 245.

The NIC can include interfaces like a radio transceiver and port to enable ethernet, mobile broadband, or Wi-Fi connections to a network router, cell tower, or access point. The NIC may transport frames of data between network nodes (e.g., a router, switch, access point, etc.) using, for example, MAC (Media Access Control) addressing. The TPM may provide a trusted execution environment within the IoT device to enable secure processing and, for example, authentication of the IoT device using a unique key stored therein. The GPS may operate regularly or periodically to verify the location of the IoT device. Depending on the specific IoT device and its application, a diverse set of one or more sensors may be implemented with the IoT device, such as temperature sensors, pressure sensors, barometers, proximity sensors, etc.

The application layer 205, in this illustrative example, supports various applications 265 including an automated assignment application 260. Any number of applications can be utilized by the IoT device 105, whether proprietary or third-party applications. The applications can be implemented using locally executing code. However, in some cases, applications can rely on services and/or remote code execution provided by remote servers or other computing platforms. The automated assignment application may be a standalone application or a module within a larger application which performs various processes and tasks for the IoT device (individually or collectively the "automated assignment application"). The automated assignment application may be responsible for transmitting various information to the IoT hub 130 (FIG. 1), such as access credentials, location data, and network information such as a subnet to which the IoT device is connected.

The OS layer 210 supports, among other operations, managing the operating system 250 and operating applications 255. The OS layer may interoperate with the application and hardware layers to facilitate execution of programs and perform various functions and features.

FIG. 3 shows an illustrative diagram describing a subnet 115 which provides access for the IoT devices to the LAN 110 (FIG. 1). A subnet may be defined as a part of a larger network such as a WAN, LAN, etc. In some implementations, the subnet is formed by the gateway or network device to which the IoT devices are connected 305. For example, one or more IoT devices that are connected to the same router may be on the same subnet. One or more other IoT devices which are connected to a different router may be on a separate subnet. A subnet may also be defined in scenarios in which a subnet mask is utilized on a network device for IoT devices that share a network prefix and subnet number in their IP (Internet Protocol) addresses, as representatively shown by numeral 310. Thus, IoT devices connected to the same router may be separated into distinct subnets. Inside box 315 is shown an exemplary common subnet number (0.83) for two different IoT devices or hosts connected to the same router, according to which the IoT devices for both respective IP addresses are on the same subnet. Thus, multiple subnets can be derived from a single network device when utilizing a subnet mask and subnetting procedures.

FIG. 4 shows an exemplary local area network (LAN) 405 which includes an edge gateway device 410, one or more routers 415, and subnets 420 which may be separate networks on the same router. While FIG. 4 shows the router with multiple subnets, the router may not be divided into separate subnets or alternatively may be divided into more or less subnets depending on the specific configuration of the router. The routers may communicate with the edge gateway device which ultimately routes messages between the IoT hub and the routers within the LAN. As shown in FIG. 4, each router and the edge gateway device may also be considered a subnet for the LAN. Thus, while subnets may be based on distinct networks on the same router, the routers themselves may likewise be a unique subnet.

FIG. 5 shows an illustrative environment in which groups 535 of IoT devices 105 are connected with and utilize specific IoT solutions based on the subnet to which they are connected. Each subnet 505, 510, and 515 may be, for example, associated with specific departments or divisions within an organization, such as an HVAC department, technology department, and manufacturing department, respectively. The IoT solution utilized by the respective departments are analytics 520, data storage 525, and machine learning 530. Thus, the IoT solution utilized for specific departments may vary since each department may be using cloud services for different purposes. The assignment to IoT solutions based on the subnet facilitates a device-based virtual local area network (VLAN) environment. That is, the VLAN is comprised of groups of IoT devices based on the subnet to which they are connected, which can be divided by department or division as illustratively shown.

Figure 6:
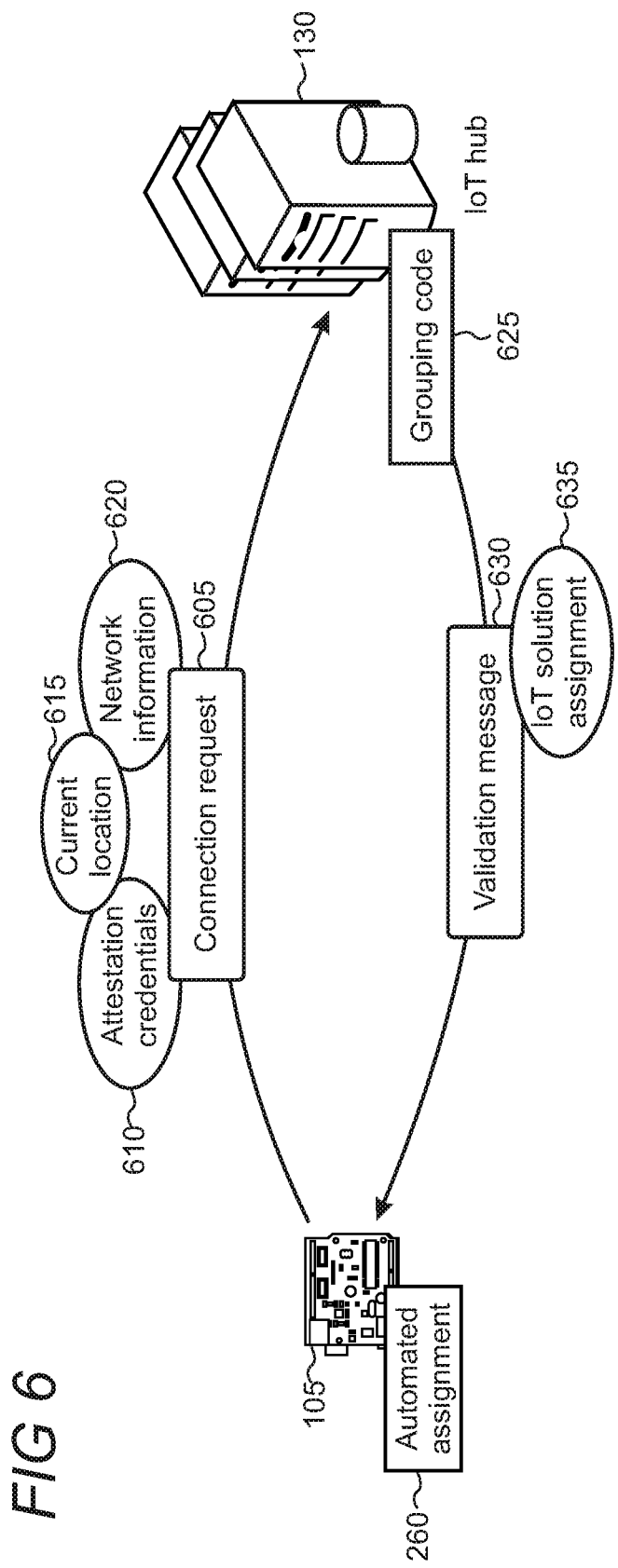
FIG. 6 shows an illustrative environment in which a connection request and validation message are exchanged between the IoT device and the IoT hub.

FIG. 6 shows an illustrative environment in which the IoT device 105 transmits a connection request 605 to a cloud service provider, using the automated assignment application 260. While FIG. 6 shows the IoT device transmitting the connection request to an IoT hub, in some implementations, the IoT device may transmit a connection request to a provisioning service (not shown) which validates the IoT device before enabling the IoT device to use IoT solutions from the IoT hub 130. The IoT hub or a provisioning service each operate on one or more servers with databases to communicate and validate the IoT device. Reference to the IoT hub indicates operations by a remote server and may signify operations by the provisioning service, IoT hub, or both the IoT hub and the provisioning service.

With the connection request, the IoT device transmits attestation credentials 610, a current location 615, and network information 620. The attestation credentials can include a private key within the IoT device's TPM along with other unique information for the IoT hub to identify, validate, and permit access to the IoT solutions. The network information can include an assigned IP (Internet Protocol) address which can be utilized to identify networks to which the IoT device is connected, such as the subnet. Subnet information can be parsed from the provided IP address to facilitate the subnet-based allocation to a specific IoT solution. The current location may be geographic coordinates such as latitude and longitude obtained from the GPS within the IoT device.

Upon receiving the connection request and associated details, the IoT hub executes a grouping code 625 to identify an IoT solution to assign the IoT device to. This can enable a quick setup and operability of the IoT device with the IoT hub upon connecting to the LAN. After the IoT hub validates the IoT device using the received information from the connection request, the IoT hub transmits a validation message 630 to permit the IoT device to use an IoT solution along with an IoT solution assignment 635. Details on the IoT hub selecting an IoT solution for the IoT device are provided in greater detail below.

Figures 7, 8:
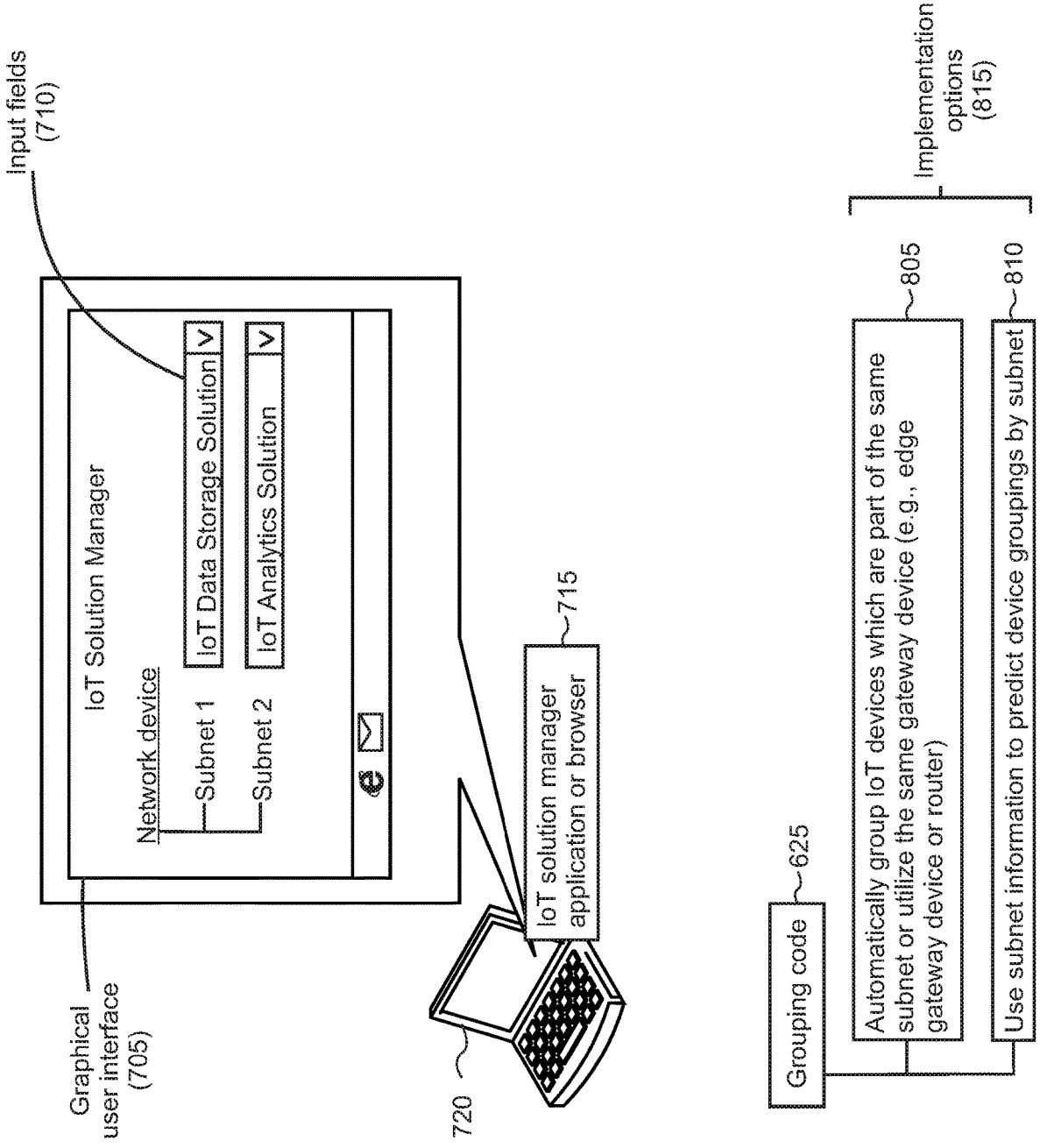
FIG. 7 shows an illustrative graphical user interface by which a customer is provided manual control over selecting the subnet-based IoT solution.
FIG. 8 shows an illustrative taxonomy of grouping codes which may be executed by the IoT hub to assign IoT devices to IoT solutions.

The IoT hub may provide input fields to a customer to define their subnets and assign each subnet to an IoT solution. FIG. 7 shows an illustrative graphical user interface (GUI) 705 which a customer's computing device 720 may access using, for example, an IoT solution manager application or browser 715. The GUI provides input fields 710 which allow the user to select specific IoT solutions operating on the IoT hub for the customer's subnets. Although the GUI shows multiple subnets for a network device, in other exemplary depictions the network device may also be considered its own subnet, such that IoT devices connected to the network device are part of a unique subnet. While a GUI is shown in FIG. 7, other types of user interfaces that are arranged to enable user control over subnet and IoT solution mapping may also be utilized according to the needs of a particular implementation.

FIG. 8 shows a taxonomy of features of the grouping code which facilitates the expeditious setup of the IoT device and assignment to an IoT solution. For example, after the customer's subnets are associated with specific IoT solutions, the grouping code 625 can include implementation options 815 which utilize separate procedures for selecting an appropriate IoT solution for the IoT device. Customers can utilize one or more implementation options based on their specific configuration and change the order in which they are utilized. The order of the implementation options may be set by default or customized by the customer. For example, the implementation options depicted in FIG. 8 may be performed in sequential order which may be set by default or customized by the user.

Figure 9:
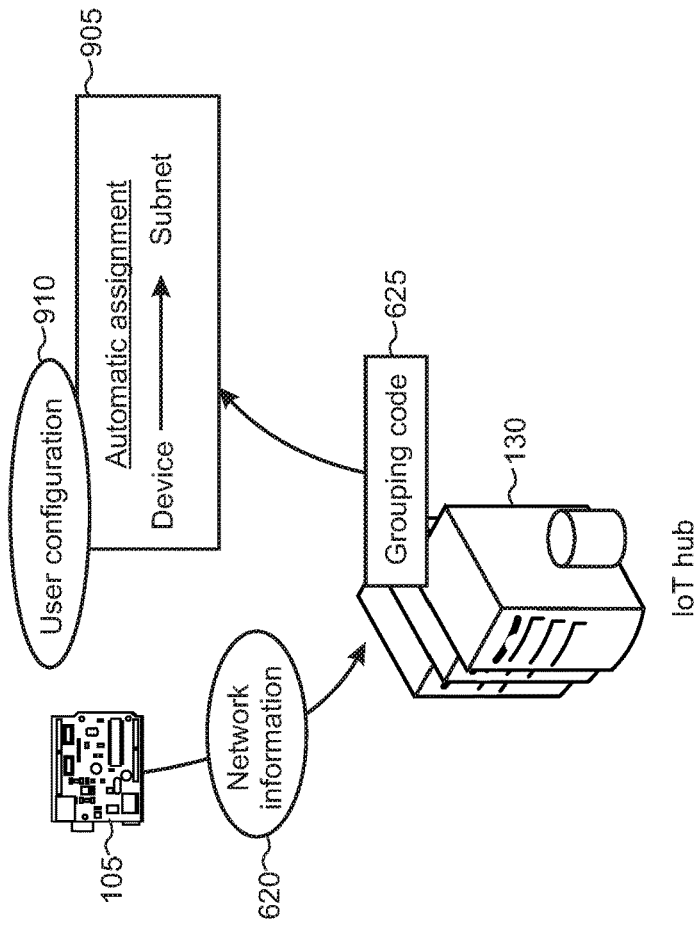
FIG. 9 shows an illustrative environment in which the IoT hub automatically assigns the IoT device to an IoT solution.

One implementation option performed by the IoT hub includes automatically grouping IoT devices which are part of the same subnet or utilize the same network device (e.g., an edge gateway device or router), as representatively shown by numeral 805. As depicted by numeral 905 in FIG. 9, upon the IoT device connecting to a subnet, the IoT hub receives this network information 620 in the connection request and automatically assigns the IoT device 105 to an associated IoT solution. The automatically assigned IoT solution may be based on the user's configuration 910 derived from the user's selection (FIG. 7).

Figure 10:
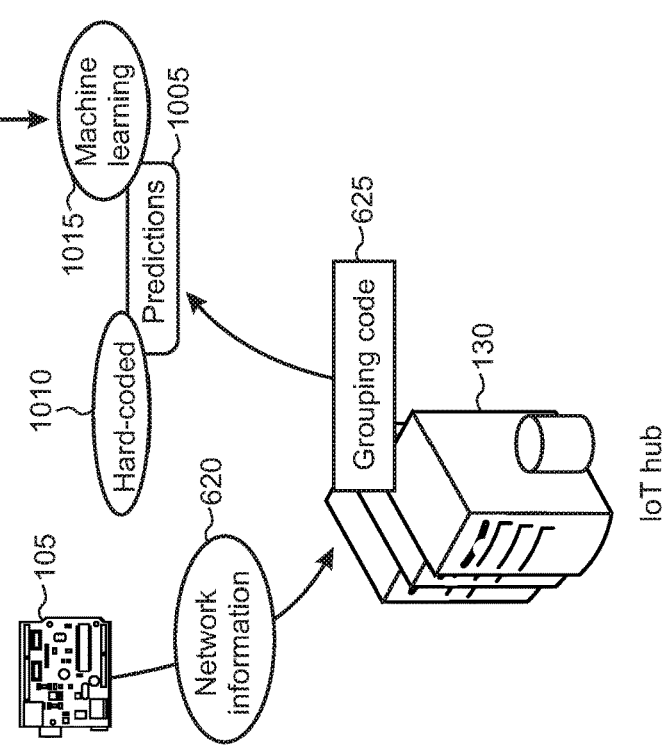
FIG. 10 shows an illustrative environment in which the IoT hub uses prediction algorithms to assign the IoT device to an IoT solution.

The implementation options may alternatively or additionally use subnet information to predict device groupings, as representatively shown by numeral 810 in FIG. 8. FIG. 10 shows an illustrative environment in which the IoT hub uses the received network information 620 and the executed grouping code 625 makes predictions 1005 using hard-coded rules 1010 or machine learning techniques 1015. The hard-coded rules may be a series of if . . . then conditions which automatically connect IoT devices using logical deductions. For example, if the customer utilizes a single IoT solution then the IoT hub can automatically associate the IoT device to the IoT solution. The machine learning techniques may utilize various parameters 1020 from one or more of the customer or distinct customers and make deductions by learning and recognizing patterns based on the collected or crowd-sourced data.

Various unsupervised, supervised, and reinforcement learning techniques can be implemented, including by way of example, clustering, classification, and regression, depending on the given scenario. Thus, the IoT hub can receive data from customers and implement various machine learning techniques to organize, parse, learn, and make use out of the data in order to identify, select, and assign an IoT device to an appropriate IoT solution.

FIG. 11 shows a taxonomy of illustrative parameters 1020 which may be utilized by and affect the machine learning decision-making processes. The parameters for the IoT devices can include a serial number 1105, type 1110, model 1115, sensors and/or data gathered 1120, subnet to which IoT devices are connected 1125, and geographical region or geofence inside which IoT devices are located 1130. The utilization of the parameters in conjunction with known subnets by IoT devices can be informative as to the systematic set-up for the respective customer's organization.

Using the various parameters, IoT devices with heterogenous characteristics may still connect to a same IoT solution if collected data indicates that similar IoT devices with heterogenous characteristics are connected to a same IoT solution. For example, in some scenarios a proximity sensor and temperature sensor may both be utilized by a customer to gather a holistic representation for the environment. While the proximity sensor and temperature sensor are different types of sensors and gather different data, they may still utilize a same IoT solution. The prediction can correctly select the proper IoT solution for both diverse IoT devices based on known groupings of those sensors being connected to the same subnet and using the same IoT solution.

Figure 12:
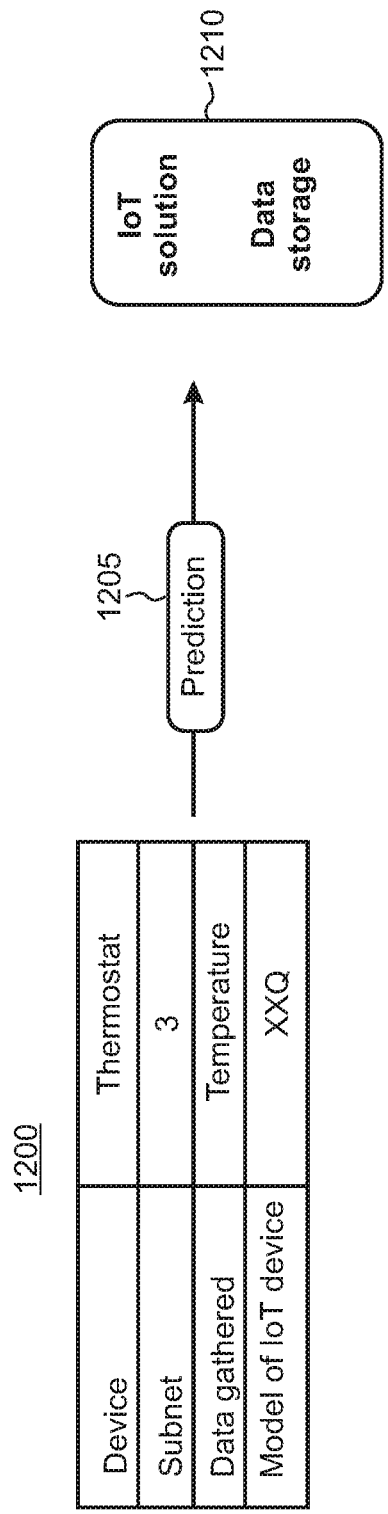
FIGS. 12 and 13 show illustrative scenarios in which the IoT hub selects an IoT solution using exemplary real-world data.
Figure 13:
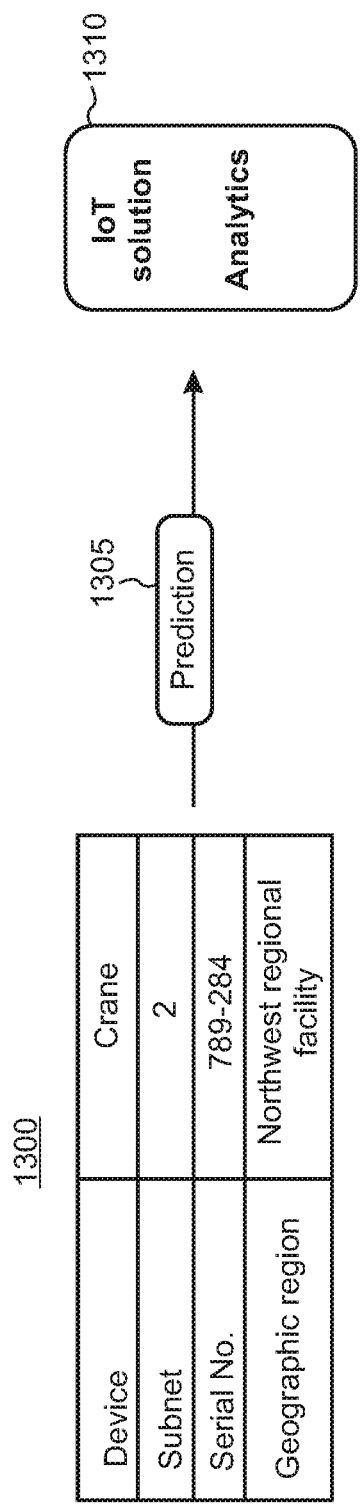

FIGS. 12 and 13 show illustrative scenarios 1200 and 1300 by which predictions to an IoT solution are made. In FIG. 12, the available information indicates that the IoT device is a thermostat which collects temperature data, is connected with subnet 3, and its model is XXQ. Parsing this information with other relevant information causes the IoT hub to make a prediction 1205 that the IoT device can connect with and use a data storage IoT solution 1210. The prediction may have been based on one, multiple, or all of the fields of information provided. The utilization of subnet 3 by the thermostat and the collection of temperature data may indicate and reinforce the proposition that this is an HVAC department which uses the data storage IoT solution, at least with respect to that IoT device on subnet 3.

In FIG. 13, the available information indicates that the IoT device is a crane at a northwest regional facility that is connected to subnet 2 and has a serial number of 789-284. Based on the utilized subnet, type of device, and geographic location, the IoT hub may know that other available cranes within that region or geofence utilize the analytics IoT solution 1310 and thereby makes that prediction 1305.

FIG. 14 shows an illustrative diagram in which an IoT device's location is utilized as part of a geofenced attestation process to enhance the security over IoT devices used by companies. For example, IoT-enabled devices, such as machinery or equipment ranging from hospital equipment to construction equipment, can be expensive for organizations. Some devices are more transportable than others, but many devices can be accidentally misplaced or potentially stolen. FIG. 14 shows an illustrative defined geographical region or geofence 1405 which can be used to verify an IoT device is properly located. The defined region or geofence may be inside a building 1420, inside a department of a building (e.g., floor, section of a building, room, or other division) 1425, inside a defined perimeter 1430, a defined geographical region (e.g., section of a country, state, or town inside a metric distance, etc.) 1435, or according to some other definition 1440.

The IoT device's current location may be transmitted during the connection request process (FIG. 6) and thus can be utilized as part of the process. If the IoT device is not inside the defined region or geofence, then the IoT hub may choose to invalidate the IoT device and therefore prohibit the device from using the IoT solution. If the IoT device is inside the defined region or geofence, then the IoT hub may validate the IoT device and authorize the IoT device to use the IoT solution. IoT device 1410 is inside the defined region 1405 and is therefore a valid location, whereas IoT device 1415 is outside of the defined region and is therefore an invalid location.

FIG. 15 shows a flowchart of an illustrative method used to validate the IoT device. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1505, the IoT device transmits a connection request to the IoT hub. This step may be comparable to that which is depicted in FIG. 6, where the IoT device transmits attestation credentials, a current location, and network information. In step 1510, the IoT hub verifies the credentials of the IoT device (e.g., a private key, subscription information, customer payment is up to date). In step 1515, the IoT hub verifies that the IoT device is located inside an authorized region or geofence (FIG. 14). In step 1520, the IoT hub validates the IoT device and assigns it to an IoT solution based on the subnet to which the IoT device is connected. The IoT hub may periodically re-validate the IoT device and thus the process starts again at step 1505.

The IoT device may automatically re-validate itself or do so responsive to a request from the IoT hub. In some implementations, the IoT device receives a short-lived token which is assigned a duration of time before expiration. When the token expires, the customer is prohibited from using the IoT solution until re-validating with the IoT hub. Renewal of the token or receiving a new token from the IoT hub may occur after re-validation. Re-validation may be done according to the steps shown in FIG. 15, or alternatively may be done by one or more steps, such as verifying the IoT device's location. In that implementation, the IoT device may transmit its current location to the IoT hub for verification that it is inside its geofence or defined region. Upon verification the IoT device may be assigned a new short-lived token.

Figure 16:
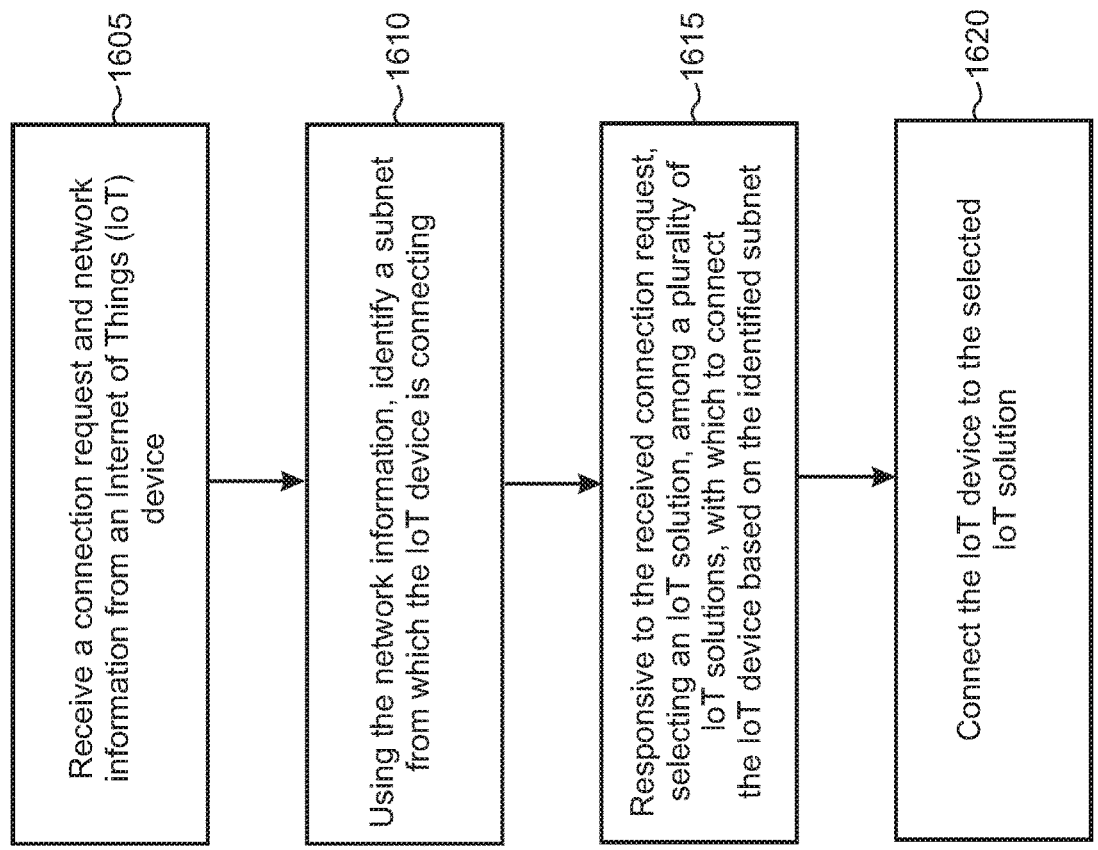
FIGS. 16-18 show illustrative processes performed by the one or more of IoT hubs, IoT devices, or user computing devices.

FIG. 16 is a flowchart of an illustrative method 1600 which may be performed by an IoT hub using one or more servers. In step 1605, the IoT hub receives a connection request and network information from an IoT device. In step 1610, the IoT hub identifies a subnet from which the IoT device is connecting using the network information. In step 1615, the particular IoT solution among a plurality of different IoT solutions with which to connect the IoT device is selected responsive to the received connection request and based on the identified subnet. In step 1620, the IoT hub connects the IoT device to the selected IoT solution.

Figure 17:
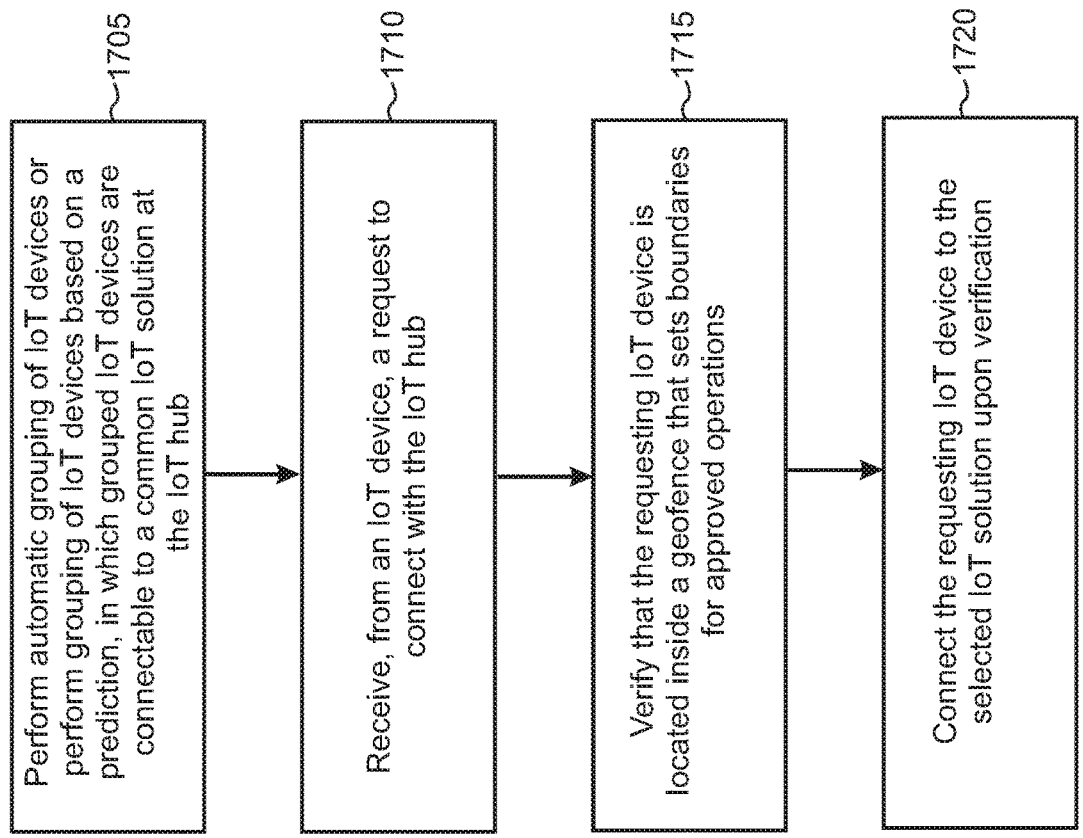

FIG. 17 is a flowchart of an illustrative method 1700 which may be performed by an IoT hub using one or more servers. In step 1705, the IoT hub performs automatic grouping of IoT devices or performs grouping of IoT devices based on a prediction. The grouped IoT devices are connectable to a common IoT solution at the IoT hub. In step 1710, the IoT hub receives a request to connect with the IoT hub from an IoT device. In step 1715, the IoT hub verifies the requesting IoT device is located inside a geofence that sets boundaries for approved operations. In step 1720, the IoT hub connects the requesting IoT device to the selected IoT solution upon verification.

Figure 18:
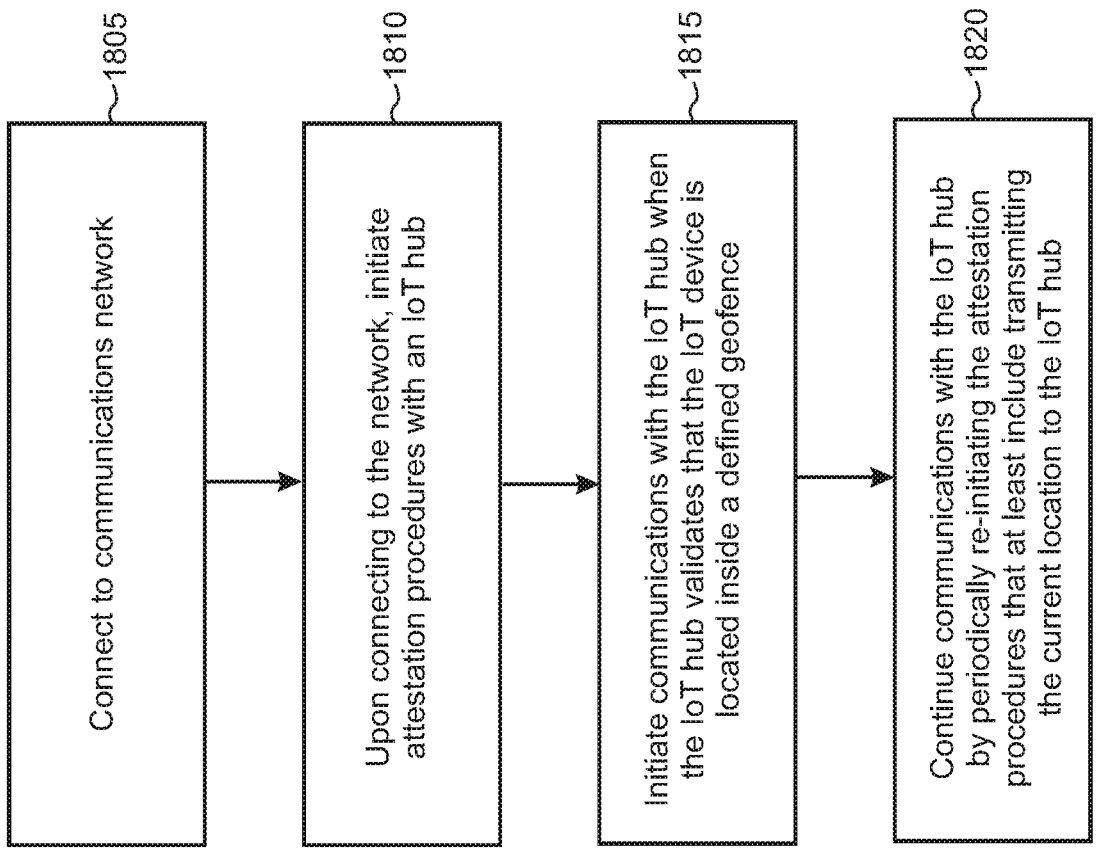

FIG. 18 is a flowchart of an illustrative method 1800 which may be performed by an IoT device in communication with an IoT hub. In step 1805, the IoT device connects to a network. In step 1810, upon connecting to the network, the IoT device initiates attestation procedures with the IoT hub. In step 1815, the IoT device initiates communications with the IoT hub when the IoT hub validates that the IoT device is located inside a defined geofence. In step 1820, the IoT device continues communications with the IoT hub by periodically re-initiating the attestation procedures with the IoT hub. The re-initiated attestation procedures can at least include transmitting the current location to the IoT hub to verify the IoT device is still located inside the defined geofence.

Figure 19:
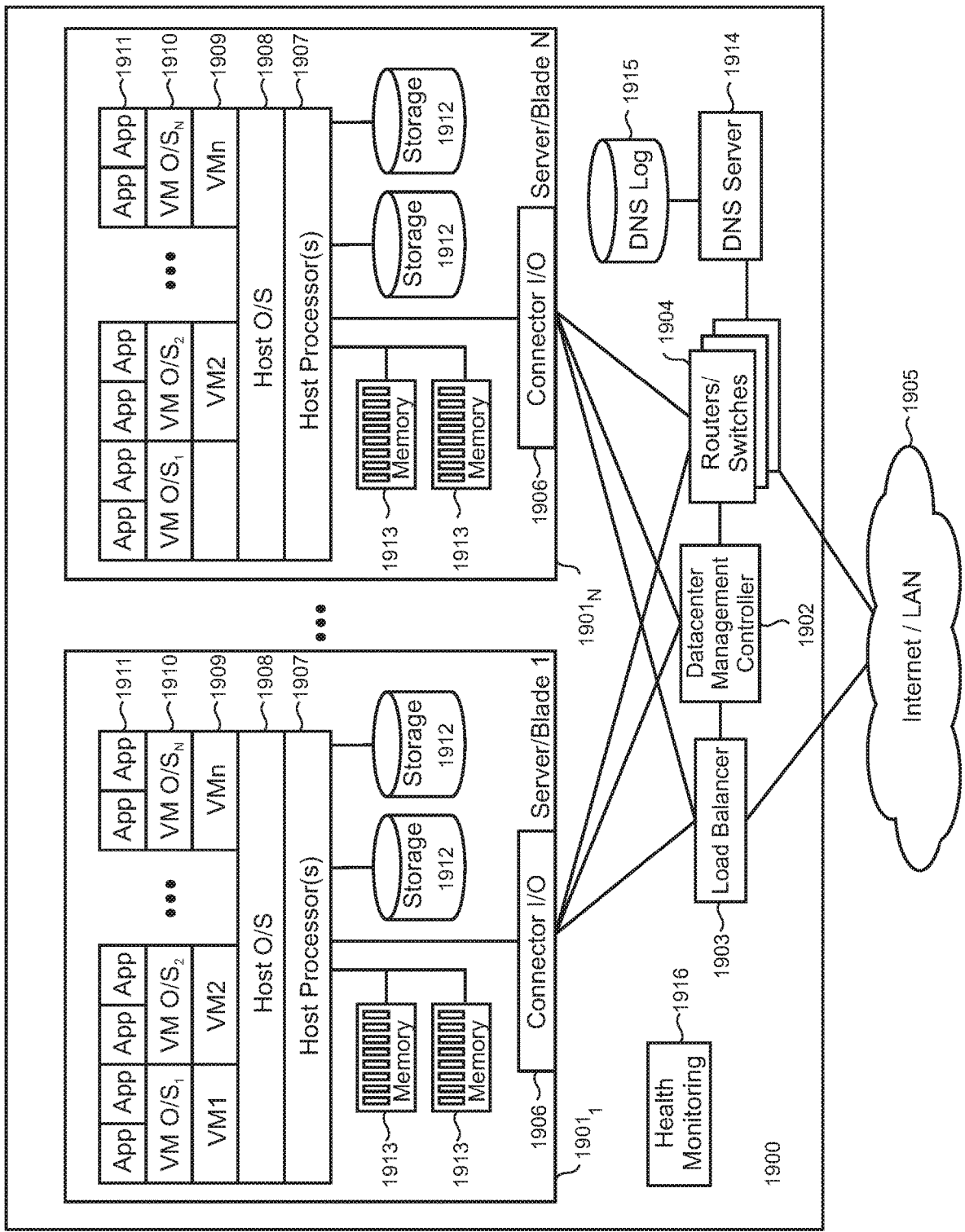
FIG. 19 is a block diagram of an illustrative datacenter that may be used at least in part to implement the present subnet-based device allocation with geofenced attestation.

FIG. 19 is a high-level block diagram of an illustrative datacenter 1900 that provides cloud computing services or distributed computing services that may be used to implement the present subnet-based device allocation with geofenced attestation. A plurality of servers 1901 are managed by datacenter management controller 1902. Load balancer 1903 distributes requests and computing workloads over servers 1901 to avoid a situation wherein a single server may become overwhelmed. Load balancer 1903 maximizes available capacity and performance of the resources in datacenter 1900. Routers/switches 1904 support data traffic between servers 1901 and between datacenter 1900 and external resources and users (not shown) via an external network 1905, which may be, for example, a local area network (LAN) or the Internet.

Servers 1901 may be standalone computing devices, and/or they may be configured as individual blades in a rack of one or more server devices. Servers 1901 have an input/output (I/O) connector 1906 that manages communication with other database entities. One or more host processors 1907 on each server 1901 run a host operating system (O/S) 1908 that supports multiple virtual machines (VM) 1909. Each VM 1909 may run its own O/S so that each VM O/S 1910 on a server is different, or the same, or a mix of both. The VM O/Ss 1910 may be, for example, different versions of the same O/S (e.g., different VMs running different current and legacy versions of the Windows® operating system). In addition, or alternatively, the VM O/Ss 1910 may be provided by different manufacturers (e.g., some VMs running the Windows® operating system, while other VMs are running the Linux® operating system). Each VM 1909 may also run one or more applications (Apps) 1911. Each server 1901 also includes storage 1912 (e.g., hard disk drives (HDD)) and memory 1913 (e.g., RAM) that can be accessed and used by the host processors 1907 and VMs 1909 for storing software code, data, etc. In one embodiment, a VM 1909 may employ the data plane APIs as disclosed herein.

Datacenter 1900 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1900 allows customers to scale up or scale down resources dynamically to meet the current needs of their business. Additionally, a datacenter operator can provide usage-based services to customers so that they pay for only the resources they use, when they need to use them. For example, a customer may initially use one VM 1909 on server $1901_1$ to run their applications 1911. When demand for an application 1911 increases, the datacenter 1900 may activate additional VMs 1909 on the same server $1901_1$ and/or on a new server $1901_N$ as needed. These additional VMs 1909 can be deactivated if demand for the application later drops.

Datacenter 1900 may offer guaranteed availability, disaster recovery, and back-up services. For example, the datacenter may designate one VM 1909 on server 1901$_1$ as the primary location for the customer's application and may activate a second VM 1909 on the same or different server as a standby or back-up in case the first VM or server 1901$_1$ fails. Datacenter management controller 1902 automatically shifts incoming user requests from the primary VM to the back-up VM without requiring customer intervention. Although datacenter 1900 is illustrated as a single location, it will be understood that servers 1901 may be distributed to multiple locations across the globe to provide additional redundancy and disaster recovery capabilities. Additionally, datacenter 1900 may be an on-premises, private system that provides services to a single enterprise user or may be a publicly accessible, distributed system that provides services to multiple, unrelated customers or may be a combination of both.

Domain Name System (DNS) server 1914 resolves domain and host names into IP (Internet Protocol) addresses for all roles, applications, and services in datacenter 1900. DNS log 1915 maintains a record of domain names that have been resolved by role. It will be understood that DNS is used herein as an example and that other name resolution services and domain name logging services may be used to identify dependencies.

Datacenter health monitoring 1916 monitors the health of the physical systems, software, and environment in datacenter 1900. Health monitoring 1916 provides feedback to datacenter managers when problems are detected with servers, blades, processors, or applications in datacenter 1900 or when network bandwidth or communications issues arise.

Figure 20:
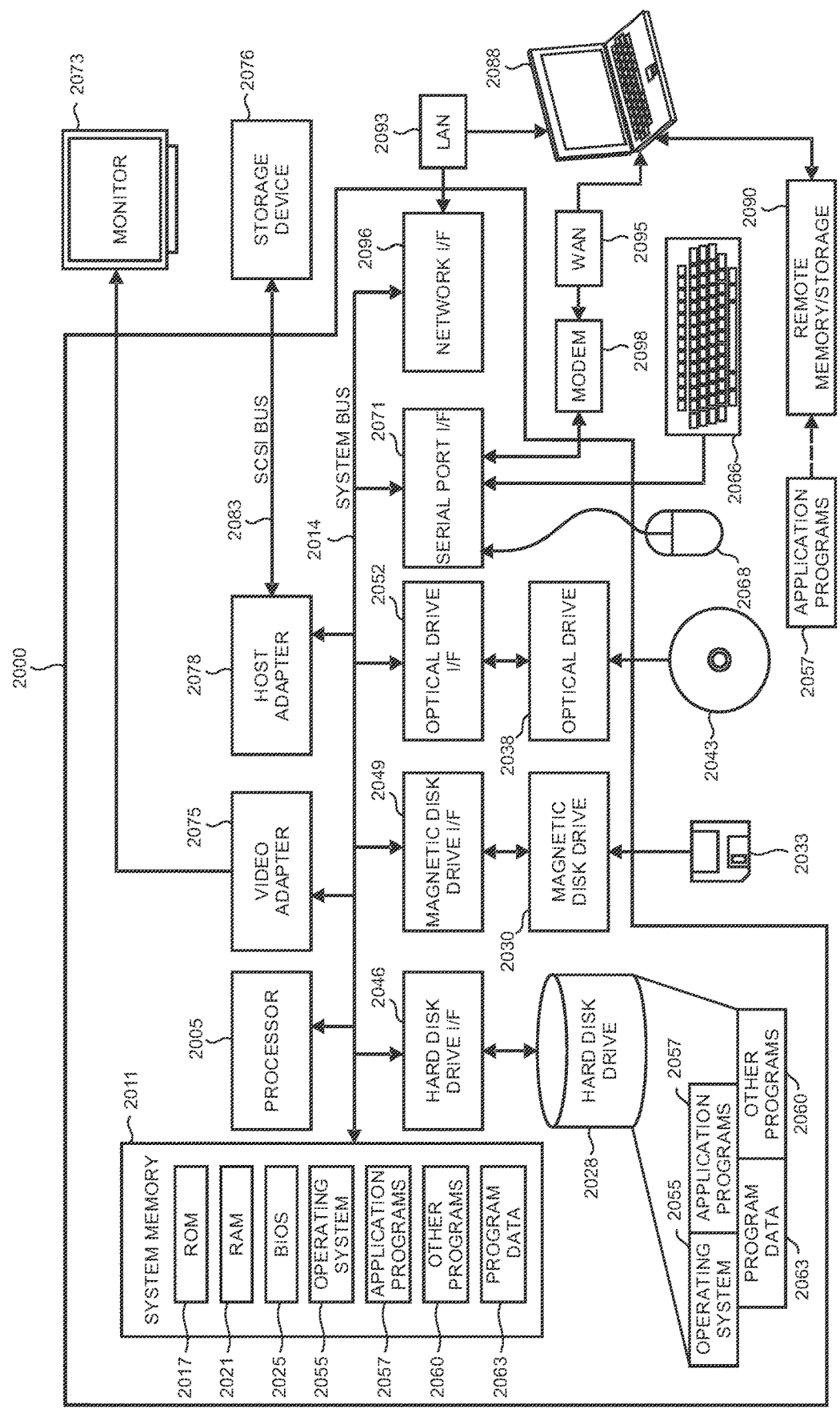
FIG. 20 is a simplified block diagram of an illustrative computing system or server that may be used in part to implement the present subnet-based device allocation with geofenced attestation.

FIG. 20 is a simplified block diagram of an illustrative computer system 2000 such as a PC, client machine, or server with which the present subnet-based device allocation with geofenced attestation may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present subnet-based device allocation with geofenced attestation. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present subnet-based device allocation with geofenced attestation.

Figure 21:
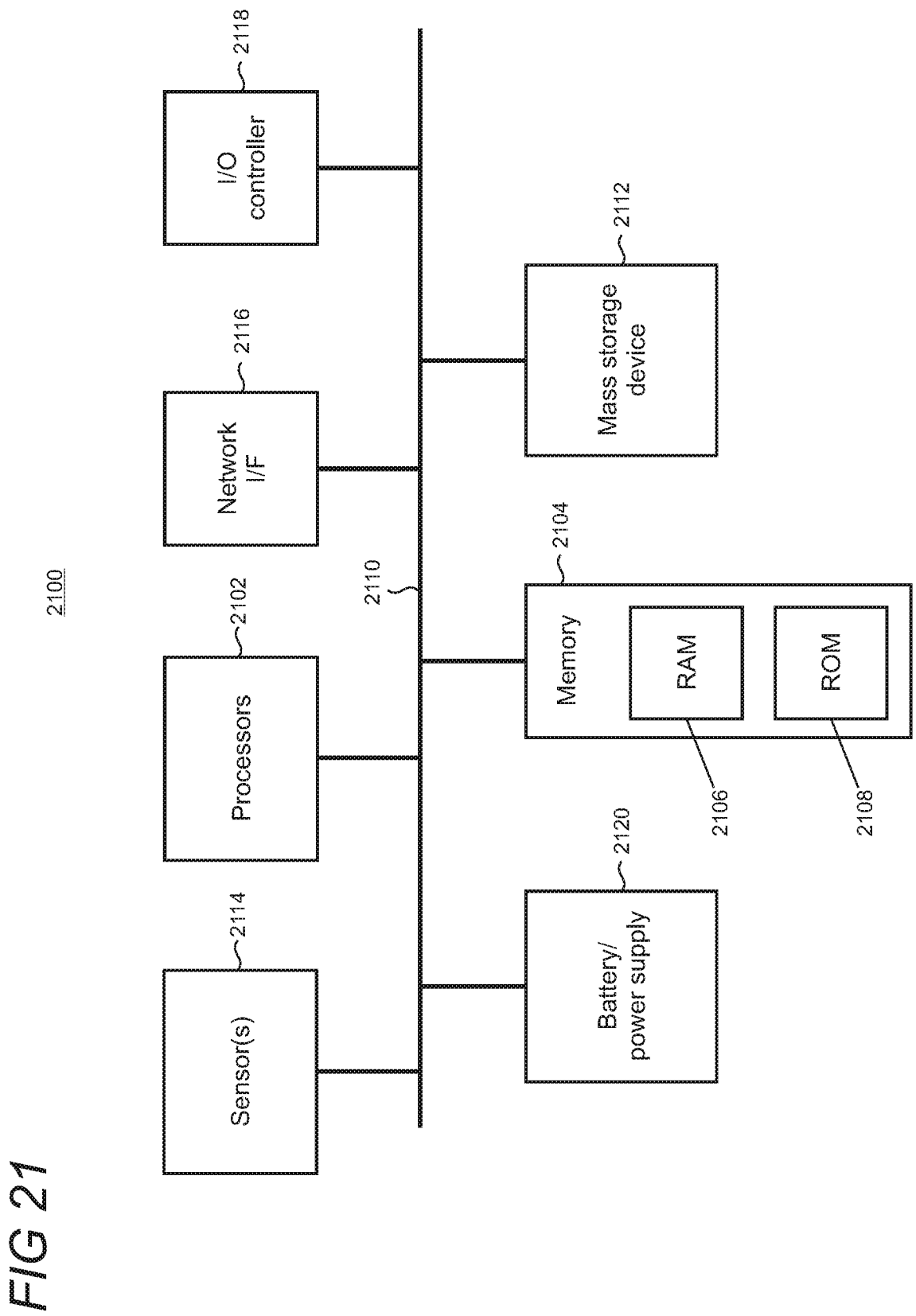
FIG. 21 is a simplified block diagram of an illustrative computer system that may be used in part to implement the present subnet-based device allocation with geofenced attestation.

FIG. 21 shows an illustrative architecture 2100 for a computing device such as a laptop computer or personal computer, or an IoT device capable of executing the various components described herein for subnet-based device allocation with geofenced attestation. The architecture 2100 illustrated in FIG. 21 includes one or more processors 2102 (e.g., central processing unit, dedicated AI chip, graphics processing unit, etc.), a system memory 2104, including RAM (random access memory) 2106 and ROM (read only memory) 2108, and a system bus 2110 that operatively and functionally couples the components in the architecture 2100. A basic input/output system containing the basic routines that help to transfer information between elements within the architecture 2100, such as during startup, is typically stored in the ROM 2108. The architecture 2100 further includes a mass storage device 2112 for storing software code or other computer-executed code that is utilized to implement applications, the file system, and the operating system. The mass storage device 2112 is connected to the processor 2102 through a mass storage controller (not shown) connected to the bus 2110. The mass storage device 2112 and its associated computer-readable storage media provide non-volatile storage for the architecture 2100. Although the description of computer-readable storage media contained herein refers to a mass storage device, such as a hard disk or CD-ROM drive, it may be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It may be appreciated that the network interface unit 2116 also may be utilized to connect to other types of networks and remote computer systems. The architecture 2100 also may include an input/output controller 2118 for receiving and processing input from a number of other devices, including a keyboard, mouse, touchpad, touchscreen, control devices such as buttons and switches or electronic stylus (not shown in FIG. 21). Similarly, the input/output controller 2118 may provide output to a display screen, user interface, a printer, or other type of output device (also not shown in FIG. 21).

It may be appreciated that the software components described herein may, when loaded into the processor 2102 and executed, transform the processor 2102 and the overall architecture 2100 from a general-purpose computing system into a special-purpose computing system customized to facilitate the functionality presented herein. The processor 2102 may be constructed from any number of transistors or other discrete circuit elements, which may individually or collectively assume any number of states. More specifically, the processor 2102 may operate as a finite-state machine, in response to executable instructions contained within the software modules disclosed herein. These computer-executable instructions may transform the processor 2102 by specifying how the processor 2102 transitions between states, thereby transforming the transistors or other discrete hardware elements constituting the processor 2102.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 2100 may further include one or more sensors 2114 or a battery or power supply 2120. The sensors may be coupled to the architecture to pick up data about an environment or a component, including temperature, pressure, etc. The power supply may be adapted with an AC power cord or a battery, such as a rechargeable battery for portability.

In light of the above, it may be appreciated that many types of physical transformations take place in the architecture 2100 in order to store and execute the software components presented herein. It also may be appreciated that the architecture 2100 may include other types of computing devices, including wearable devices, handheld computers, embedded computer systems, smartphones, PDAs, and other types of computing devices known to those skilled in the art. It is also contemplated that the architecture 2100 may not include all of the components shown in FIG. 21, may include other components that are not explicitly shown in FIG. 21, or may utilize an architecture completely different from that shown in FIG. 21.

Various exemplary embodiments of the present subnet-based device allocation with geofenced attestation are now presented by way of illustration and not as an exhaustive list of all embodiments. An example includes a method performed by an Internet of Things (IoT) hub configured using one or more servers operatively coupled to a wide area network, comprising: receiving a connection request and network information from an IoT device; using the network information, identifying a subnet from which the IoT device is connecting, wherein the subnet provides an interface to the wide area network to enable communications between the IoT device and the IoT hub; responsive to the received connection request, selecting an IoT solution, among a plurality of different IoT solutions, with which to connect the IoT device based on the identified subnet; and connecting the IoT device to the selected IoT solution.

In another example, the method further comprises: validating that the IoT devices are in an acceptable location as defined by a geofence; receiving location information from the IoT device; verifying the IoT device is within the established geofence using the received location information; if the location of the IoT device is inside the established geofence, then connecting the IoT device with the selected IoT solution; and if the location of the IoT device is outside the established geofence, then rejecting the connection and utilization of the determined IoT solution with the IoT device. In another example, the IoT device location information and network information is included with an initiation of the connection request. In another example, the method further comprises receiving user input for assignments of subnets to respective IoT solutions, and wherein the selected IoT solution is based on the assignments. In another example, selection of the IoT solution is automatically performed upon the IoT device connecting with the subnet. In another example, the subnet is identified based on a networking device to which the IoT device is connected or is identified based on a network prefix and subnet number contained within an Internet protocol (IP) address for the IoT device. In another example, the method further comprises: analyzing parameters for groups of IoT devices; and based on the analyzed parameters, predicting an IoT solution with which to connect the IoT device. In another example, the parameters are grouped by individual IoT devices within the groups of IoT devices, and the parameters include one or more of type of IoT device, serial number, model, utilized one or more sensors, type of data gathered, current subnet utilization, or geographical region or geofence inside which an IoT device is located. In another example, IoT devices with heterogenous characteristics are grouped to a same IoT solution.

A further example includes an Internet of Things (IoT) hub including one or more servers configured to provide various IoT solutions to IoT devices based on IoT device configuration, comprising: one or more processors; and one or more hardware-based memory devices storing computer-readable instructions which, when executed by the one or more processors, cause the IoT hub to: perform automatic grouping of IoT devices or perform grouping of IoT devices based on a prediction, in which grouped IoT devices are connectable to a common IoT solution at the IoT hub; receive, from an IoT device, a request to connect with the IoT hub; verify that the requesting IoT device is located inside a geofence that defines boundaries for approved operations; and connect the requesting IoT device to the common IoT solution upon verification, wherein IoT devices behind a common subnet are automatically grouped, and wherein subnet information associated with the requesting IoT device is used by the IoT hub to perform the predicted grouping.

In another example, the automated and predicted groupings are implemented using a grouping code, in which the grouping code is unique for each customer that has groups of IoT devices that connect to the various IoT solutions provided by the hub. In another example, the requests to connect with the IoT hub include transmissions of network information including identification of one or more of a subnet number within an internet protocol (IP) address, router, wireless access point, or edge gateway device. In another example, the identification for the router or wireless access point includes a service set identifier (SSID) or basic service set identifier (BSSID). In another example, the executed instructions further cause the IoT hub to: periodically receive location information from each IoT device; and verify each IoT device is located inside the approved boundary defined by the geofences responsive to receiving the location information. In another example, the executed instructions further cause the IoT hub to transmit a token to verified IoT devices, wherein the transmitted tokens are configured to expire after a set duration of time after which a verified IoT device re-transmits location information for a new token. In another example, the executed instructions further cause the IoT hub to be accessible by a remote computing device that uses a browser or client application with extensibility to the IoT hub, and the executed instructions further cause the IoT hub to: communicate at least a portion of a user interface (UI) to the remote computing device for managing connections of IoT devices to the IoT hub, wherein the UI is configured to receive user input for assigning subnets to specific IoT solutions.

A further example includes one or more hardware-based non-transitory computer-readable memory devices storing instructions which, when executed by one or more processors disposed in an Internet of Things (IoT) device which includes hardware for network connectivity, cause the IoT device to: connect to a communications network; upon connecting to the network, initiate attestation procedures with an IoT hub, in which the attestation procedures include transmitting access credentials, a current location of the IoT device, and network information to the IoT hub to validate the IoT device and connect the IoT device to an IoT solution; initiate communications with the IoT hub when the IoT hub validates that the IoT device is located inside a defined geofence, in which the communications include one or more of transmitting data to the IoT hub or receiving data from the IoT hub; and continue communications with the IoT hub by periodically re-initiating the attestation procedures that at least include transmitting the current location to the IoT hub to verify that the IoT device is located within the geofence.

In another example, the IoT device re-initiates the attestation procedures when a duration of time associated with a locally stored token expires, and the executed instructions further cause the IoT device to receive a new token upon validation by the IoT hub. In another example, the transmitted network information includes identification for one or more of the network or a subnet which may include a gateway edge device, a router, a wireless access point, a modem, or a switch, and wherein the IoT solution with which the IoT device is connected is determined based on the transmitted network information. In another example, the IoT device is configured to automatically initiate the attestation procedures for validation with the IoT hub upon establishing the connection to the network, such that the IoT device is configured to operate upon validation and is rejected from communicating with the IoT solution if validation fails.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by an Internet of Things (IoT) hub configured using one or more servers operatively coupled to a wide area network, comprising:
receiving a request from an IoT device for connecting to one of a plurality of different IoT solutions, the request including network information and location information of the IoT device, wherein the network information comprising an Internet Protocol (IP) address of the IoT device;
identifying an existing subnet among a plurality of distinct existing subnets based on network prefix and subnet number contained within the IP address of the IoT device, wherein the identified existing subnet provides an interface to the wide area network that enables communications between the IoT hub and the IoT device;
verifying that the IoT device is within a geofence using the received location information;
adding the IoT device to a corresponding group of IoT devices responsively to the verifying,
mapping a unique IoT solution of the plurality of different IoT solutions to the corresponding group of IoT devices based on the identified existing subnet, wherein each IoT unique solution of the plurality of different IoT solutions comprises software configured to interoperate with functionalities supported by the corresponding group of IoT devices, and
connecting the unique IoT solution to the IoT device based on the mapping.

2. The method of claim 1, further comprising receiving user input for assignments of existing subnets to respective IoT solutions, and wherein the IoT solution is selected based on the assignments.

3. The method of claim 1, in which the connecting of the unique IoT solution to the IoT device is automatically performed responsively to receiving the request from the IoT device.

4. The method of claim 3, in which an existing subnet is identified based on a networking device to which the IoT device is connected.

5. The method of claim 1, further comprising:
analyzing parameters for groups of IoT devices; and
based on the analyzed parameters, predicting an IoT solution with which to connect the IoT device.

6. The method of claim 5, in which the parameters are grouped by individual IoT devices within the groups of IoT devices, and the parameters include one or more of type of IoT device, serial number, model, utilized one or more sensors, type of data gathered, current utilization of a subnet, or geographical region or geofence inside which an IoT device is located.

7. The method of claim 5, in which IoT devices with heterogenous characteristics are grouped to a same IoT solution.

8. An Internet of Things (IoT) hub including one or more servers configured to provide IoT solutions to IoT devices, comprising:
one or more processors; and
one or more hardware-based memory devices storing computer-readable instructions which, when executed by the one or more processors, cause the IoT hub to:
automatically add IoT devices to separate groups of IoT devices based on a corresponding existing subnet among a plurality of distinct existing subnets to which each IoT device belongs;
receive a request from an IoT device for connecting to one of a plurality of different IoT solutions, the request including network information comprising an Internet Protocol (IP) address of the IoT device and location information of the IoT device;
identify an existing subnet with which the IoT device connects to the IoT hub based on network prefix and subnet number contained within the IP address of the IoT device, the existing subnet being included among the plurality of existing distinct subnets;
verify that the IoT device is located inside a geofence that defines boundaries for approved operations using the location information;
add the IoT device to the grouped IoT devices responsively to the verifying;
map a unique IoT solution of the plurality of different IoT solutions to a corresponding group of IoT devices based on the identified existing subnet; and
connect the unique IoT solution to the IoT device based on the mapping, wherein each unique IoT solution of the plurality of different IoT solutions comprises software configured to interoperate with functionalities supported by the corresponding group of IoT devices.

9. The IoT hub of claim 8, in which the separate groups of IoT devices are implemented using a grouping code, in which the grouping code is unique for each customer that has groups of IoT devices that connect to the plurality of different IoT solutions provided by the hub.

10. The IoT hub of claim 8 in which the network information includes identification of one or more of router, wireless access point, or edge gateway device.

11. The IoT hub of claim 10, in which the identification for the router or wireless access point includes a service set identifier (SSID) or basic service set identifier (BSSID).

12. The IoT hub of claim 8 in which the executed instructions further cause the IoT hub to:
periodically receive location information from each IoT device; and
verify each IoT device is located inside boundaries defined by the geofences responsive to receiving the location information.

13. The IoT hub of claim 12, in which the executed instructions further cause the IoT hub to transmit a token to verified IoT devices, wherein the transmitted token is configured to expire after a set duration of time after which the verified IoT device re-transmits location information for a new token.

14. The IoT hub of claim 8 in which the executed instructions further cause the IoT hub to be accessible by a remote computing device that uses a browser or client application with extensibility to the IoT hub, and the executed instructions further cause the IoT hub to:
communicate at least a portion of a user interface (UI) to the remote computing device for managing connections of IoT devices to the IoT hub, wherein the UI is configured to receive user input for assigning existing subnets to specific IoT solutions.

15. One or more hardware-based non-transitory computer-readable memory devices storing instructions which, when executed by one or more processors disposed in an Internet of Things (IoT) device which includes hardware for network connectivity, cause the IoT device to:

connect to a communications network comprising a plurality of distinct existing subnets, wherein IoT devices in each of the plurality of distinct existing subnets are separately grouped based on a corresponding existing subnet of the plurality of distinct existing subnets to which each of the IoT devices belong, and in which a unique IoT solution of the plurality of different IoT solutions is mapped to each of the separate groups of IoT devices based on the corresponding existing subnet, wherein each unique solution of the plurality of different IoT solutions comprises software configured to interoperate with functionalities supported by the group of IoT devices;

upon connecting to one of the plurality of distinct existing subnets, initiate attestation procedures with an IoT hub, in which the attestation procedures include transmitting access credentials, a current location of the IoT device, and network information to the IoT hub to validate the IoT device and connect the IoT device to the unique IoT solution, wherein the transmitted network information include a network prefix and subnet number within an IP address of IoT device to identify an existing subnet from the plurality of distinct exiting subnets to which the IoT device is connected;

initiate communications with the IoT hub when the IoT hub validates that the IoT device is located inside a defined geofence, in which the communications include one or more of transmitting data to the IoT hub or receiving data from the IoT hub;

continue communications with the IoT hub by periodically re-initiating the attestation procedures that at least include transmitting the current location to the IoT hub to verify that the IoT device is located within the geofence, and receive an IoT solution at the IoT device from the IoT hub based on the mapping.

16. The one or more hardware-based non-transitory computer-readable memory devices of claim 15, in which the IoT device re-initiates the attestation procedures when a duration of time associated with a locally stored token expires, and the executed instructions further cause the IoT device to receive a new token upon validation by the IoT hub.

17. The one or more hardware-based non-transitory computer-readable memory devices of claim 15, in which the transmitted network information includes the identification for the existing subnet among the plurality of distinct existing subnets which includes one of a gateway edge device, a router, a wireless access point, a modem, or a switch, and wherein the IoT solution with which the IoT device is connected is determined based on the transmitted network information.

18. The one or more hardware-based non-transitory computer-readable memory devices of claim 15, in which the IoT device is configured to automatically initiate the attestation procedures for validation with the IoT hub upon establishing the connection to the communications network, such that the IoT device is configured to operate upon validation and is rejected from communicating with the IoT solution if validation fails.

* * * * *